United States Patent
Rasanen

(10) Patent No.: US 6,721,304 B1
(45) Date of Patent: Apr. 13, 2004

(54) HIGH-SPEED DATA TRANSMISSION IN A MOBILE COMMUNICATIONS SYSTEM

(75) Inventor: Juha Rasanen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/462,199

(22) PCT Filed: May 10, 1999

(86) PCT No.: PCT/FI99/00388

§ 371 (c)(1),
(2), (4) Date: Jan. 4, 2000

(87) PCT Pub. No.: WO99/59358

PCT Pub. Date: Nov. 18, 1999

(30) Foreign Application Priority Data

May 11, 1998 (FI) .................................................. 981043

(51) Int. Cl.$^7$ .............................................. H04B 7/212
(52) U.S. Cl. ....................... 370/347; 370/321; 370/337; 370/442; 370/537; 370/341; 370/450; 370/509
(58) Field of Search ................................ 370/347, 344, 370/314, 321, 328, 329, 337, 345, 535, 545, 442, 537, 340–341; 455/450, 509

(56) References Cited

U.S. PATENT DOCUMENTS

| | | | |
|---|---|---|---|
| 5,475,686 A | * 12/1995 | Bach et al. | 370/465 |
| 5,956,332 A | * 9/1999 | Rasanen et al. | 370/342 |
| 6,005,857 A | * 12/1999 | Honkasalo et al. | 370/337 |
| 6,205,157 B1 | * 3/2001 | Galyas et al. | 370/503 |
| 6,374,112 B1 | * 4/2002 | Widegren et al. | 455/452.2 |

FOREIGN PATENT DOCUMENTS

| | | | | |
|---|---|---|---|---|
| WO | 96 18248 | 6/1996 | | |
| WO | WO 9618248 A2 | * 6/1996 | | H04B/7/26 |
| WO | 97 44980 | 11/1997 | | |
| WO | WO 9744980 A1 | * 11/1997 | | H04Q/7/38 |
| WO | WO 9808351 A1 | * 2/1998 | | H04Q/7/24 |
| WO | WO 9963703 A2 | * 12/1999 | | H04L/1/18 |

OTHER PUBLICATIONS

Shkumbin Hamiti, et al.: "Enhanced Circuit Switched Data Dor Real Time Services Over GSM", 0–7803–5435–Apr. 1999, IEEE.*

* cited by examiner

*Primary Examiner*—Dang Ton
*Assistant Examiner*—Tri H. Phan
(74) *Attorney, Agent, or Firm*—Pillsbury Winthrop LLP

(57) ABSTRACT

A channel configuration of a digital mobile communications system comprises two or more lower-rate transmission channels for each high-speed radio interface traffic channel between a base station and an interworking function. Radio frames, such as EDGE frames, are transmitted over a radio interface traffic channel. Transmission frames, such as TRAU frames, are transmitted on a transmission channels. The base station and the interworking function provide the transmission frames to be transmitted with frame and/or channel numbering which indicates the order of the transmitted frames and/or the transmission channel via which the transmission frame was transmitted. According to the invention, the base station does not restore the order of the downlink transmission frames on the basis of said frame and/or channel numbering but it places the data of the transmission frames and at least the frame and/or channel numbering in the payload of the downlink radio frame to be transmitted. Instead, the mobile station, which extracts the data and the frame and/or channel numbering of the transmission frames from the downlink radio frames, restores the correct order of the data on the basis of this numbering. The invention simplifies the structure of a base station.

19 Claims, 3 Drawing Sheets

HIGH-SPEED DATA TRANSMISSION IN A MOBILE COMMUNICATIONS SYSTEM

This application is the national phase of international application PCT/FI99/00388 filed May 10, 1999 which designated the U.S.

The invention relates to high-speed data transmission in mobile communications systems, especially when a multichannel configuration is used.

In mobile systems, the transmission capacity available at the radio interface is divided among a plurality of users according to a multiple access principle. The most commonly used multiple access schemes include time division multiple access (TDMA), code division multiple access (CDMA) and frequency division multiple access (FDMA). In TDMA systems, communication over a radio path takes place on a time division basis in successive recurrent TDMA frames, each of which comprises several time slots. A short information packet is transmitted in each time slot in the form of a radio-frequency burst of a limited duration, consisting of a number of modulated bits. The time slots are mainly used for conveying control channels and traffic channels. Traffic channels are used for transmitting speech and data, whereas control channels are used for signalling between a base station and mobile stations. An example of a TDMA radio system is the pan-European mobile system GSM (Global System for Mobile Communications).

In a CDMA system, a traffic channel is determined by a unique spreading code assigned to a mobile station, whereas in an FDMA system a traffic channel is determined by a radio channel.

Maximum data transfer rate on a single traffic channel is limited to a rather low level according to the available bandwidth and the channel coding and error coding used in the transmission. For example, in the GSM system the user data rate of a traffic channel employing one time slot was limited to 9.6 kbit/s according to the original specifications, and the radio interface rate was 12 kbit/s. However, this has been found insufficient for many of the new teleservices, such as telefax, video transmission etc., wherefore new mobile systems are being provided with high-speed data transmission services based on so-called multichannel technology. In multichannel technology, a mobile station is provided with a higher bit rate and a greater bandwidth by means of several parallel basic traffic channels (e.g. several time slots). For example in the GSM mobile system, high-speed data service HSCSD (High Speed Circuit Switched Data) is defined in recommendations GSM 01.34, GSM 02.34 and GSM 03.34 of the ETSI (European Telecommunications Standards Institute). In the HSCSD concept, a high-speed data signal is divided into separate data streams, which are then transferred via N subchannels (N traffic channel time slots) at the radio interface and, correspondingly, via N subchannels between the base station and the mobile services switching centre (transcoder). After the data streams have been divided, they are transferred on the subchannels as if they were mutually independent until they are combined at the receiving end. However, logically these N subchannels are parts of the same HSCSD connection, in other words they form one HSCSD traffic channel. The capacity of an HSCSD traffic channel is thus almost eightfold compared to the capacity of a basic traffic channel, which considerably improves the data transfer rate. The GSM HSCSD is capable of supporting a radio interface rate of 96 kbit/s (8×12 kbit/s) and user rates of up to 64 kbit/s and 76.8 kbit/s (8×9.6 kbit/s) at the radio interface.

The EDGE (Enhanced Data Rates for GSM Evolution) project of the ETSI is in the process of-developing a new modulation method providing a higher data rate per time slot than the present GMSK modulation, while retaining the channel spacing of 200 kHz and the TDMA frame structure. This enables supporting the present HSCSD data services with a lower number of time slots. The new modulation method also makes it possible to provide new data services with a data rate that may be as high as 64 kbit/s per time slot or over 64 kbit/s (n*64 kbit/s) in a multislot constellation. According to the present alternative modulation methods, the radio interface rate is either 28.8 kbit/s or 38.4 kbit/s on a single channel.

A problem related to multichannel technology is how to distribute the data arriving from high-speed data sources into separate channels (subchannels) and how to assemble the data received from the separate channels into the correct (original) order. This problem relates to both the mobile station and the mobile communication network.

In the HSCSD service of the GSM system this has been solved by using subchannel numbering and intra-subchannel frame numbering. During a connection mutually different channel numbers are assigned to parallel traffic channels. High-speed data is divided at the transmitting end into frames, each of which is provided with a channel number which indicates the parallel traffic channel used for the transmission. The frames are divided into parallel traffic channels at the transmitting end in a sequential order following the channel numbering and transmitted to the receiving end. At the receiving end the data contained in the frames is assembled back into a high-speed data signal in the sequential order according to the channel numbers contained in the frames. Furthermore, frame numbering is used within each subchannel to improve the sensitivity of data transmission to relative inter-subchannel transmission delays, which may confuse the order of the frames at the reception. The frame numbering is also transferred in each frame. The arrangement disclosed above is described for example in ETSI/GSM recommendation 03.34 and in Finnish Patent 97187. Such inband channel and frame numbering consumes the channel capacity, which has been reduced by inserting the channel and frame numbering in place of the data in V.110 frames.

The situation changes significantly as a result of the new modulation method of the EDGE. The data rate at the radio interface and the data rate over a leg between a base station and an interworking function (usually located remote from the base station at a mobile services switching centre) are no longer directly compatible or adapted one-to-one, unless entirely new rate adaptation functions are defined between the base station and the interworking function.

The EDGE project suggests several new alternative solutions for this problem. One alternative is to define completely new rate adaptation functions, optimized for the EDGE, between the base station and the interworking function. Another alternative manner is to use existing TRAU formats and physical 16 kbit/s channel structures at an Abis interface. Since data rates exceeding 14.4 kbit/s cannot be rate-adapted into one 14.4 kbit/s TRAU frame, TRAU frames of several Abis transmission channels must be used to provide the higher capacity required by the EDGE radio interface. In this case, the base station must process a higher number of Abis transmission channels than the number of time slots used at the EDGE radio interface. For example, one time slot (channel) at the EDGE radio interface (28.8 kbits) would require two Abis transmission channels with a 14.4 kbit/s TRAU format. Correspondingly, two 28.8 kbit/s EDGE channels (57.6 kbits multichannel configuration) would require four Abis transmission channels.

An advantage of using the present rate adaptation functions is that the EDGE radio interface does not require changes in the Abis interface and the TRAUs. A drawback is the increased complexity of the base station, which results from the base station having to process two different legs with different frames and channel numbers. In the uplink direction the base station must receive the EDGE frames from the radio interface channels, restore the order of data, place the data in the TRAU frames and transmit the frames via a greater number of transmission channels to the interworking function. Correspondingly, in the downlink direction the base station must receive the TRAU frames from the transmission channels, restore the order of data, place the data in the EDGE frames and transmit the frames via a smaller number of channels at the radio interface.

An object of the present invention is to simplify the operation and structure of a base station in a mobile communications system which requires a higher number of transmission channels than traffic channels, and where the traffic and transmission channels employ different frame structures.

The invention relates to methods according to claims 1 and 4, digital mobile communications systems according to claims 7 and 9, a base station according to claim 13 and mobile stations according to claims 16 and 18.

Each high-speed traffic channel at the radio interface requires two or more lower-rate transmission channels between the base station and the interworking function, which is typically located at the mobile services switching centre. Radio frames, such as EDGE frames, are transmitted over a radio interface traffic channel. Transmission channels are used for transmission of transmission frames, such as TRAU frames. Since each transparent call always has at least two parallel transmission channels via which the transmission frames are transmitted, the base station and the interworking function provide the transmission frames to be transmitted with frame and/or channel numbering which indicates the order of the transmitted frames and/or the transmission channel via which the transmission frame was transferred. According to the invention, the base station does not restore the order of the downlink transmission frames according to the aforementioned frame and/or channel numbering, but it places the data of the transmission frames and at least the frame and/or channel numbering in the payload of the downlink radio frame to be transmitted. Instead, the mobile station, which extracts the data and the frame and/or channel numbering of the transmission frames from the downlink radio frames, restores the correct order of the data on the basis of this numbering.

The radio interface also employs two or more traffic channels, for example according to the GSM HSCSD concept. Even in such a case the radio interface does not require separate frame and/or channel numbering to restore the order of the data if the internal timing of the radio system, comprising time slot numbering, is used for this purpose. In other words, it is possible to utilize the natural order of the time slots in the TDM system (e.g. time slot 0 precedes times slot 1, time slot 1 precedes time slot 2, . . . , time slot 6 precedes time slot 7, time slot 7 precedes time slot 0 of the next burst/frame, etc.). If separate numbering is used at the radio interface, the base station can provide the downlink radio frames to be transmitted with some other frame and/or channel numbering. The mobile station restores the order of the received radio frames or the contents thereof on the basis of this other numbering before the data and the frame and/or channel numbering of the transmission frames are separated from the radio frames. The mobile station thereafter restores the order of the data on the basis of the frame and/or channel numbering of the transmission frames. Correspondingly, the mobile station provides the uplink radio frames to be transmitted with the aforementioned other frame and/or channel numbering. The base station does not restore the order of the radio frames on the basis of the other numbering, but it places the data and the frame and/or channel numbering of the radio frames in the uplink transmission frames to be transmitted. The base station also provides the uplink transmission frames to be transmitted with its own frame and/or channel numbering. The interworking function restores the order of the transmission frames or the contents thereof on the basis of this numbering before the data and the frame and/or channel numbering of the radio frames are separated from the transmission frames. The interworking function thereafter restores the order of the data on the basis of the frame and/or channel numbering of the radio frames.

The base station can also insert other control and status information of the transmission frames into the downlink radio frames. The base station preferably inserts the transmission frames into the radio frames as such, so that the base station does not have to identify the frame and channel information at all. Correspondingly, the base station can also place in the uplink transmission frames other control information for the radio frames, preferably the radio frames as such.

Due to the invention some of the functions related to frame and/or channel numbering are no longer carried out at the base station, which leads to a less complicated and more economical base station. The functions are transferred to the mobile station and the interworking function, since the base station forwards the numbering directly from the interworking function to the mobile station or vice versa.

Therefore an objective of the invention is to develop a method and an apparatus implementing the method such that the aforementioned problems can be solved. The objectives of the invention are achieved with a method and a system which are characterized by what is disclosed in the independent claims. The preferred embodiments of the invention are disclosed in the dependent claims.

In the following, the invention will be described in greater detail in connection with the preferred embodiments with reference to the accompanying drawings, in which FIG. 1 shows a protocol structure for transparent traffic channels TCH/F4.8 and TCH/F9.6 in a GSM system;

Figure 1:
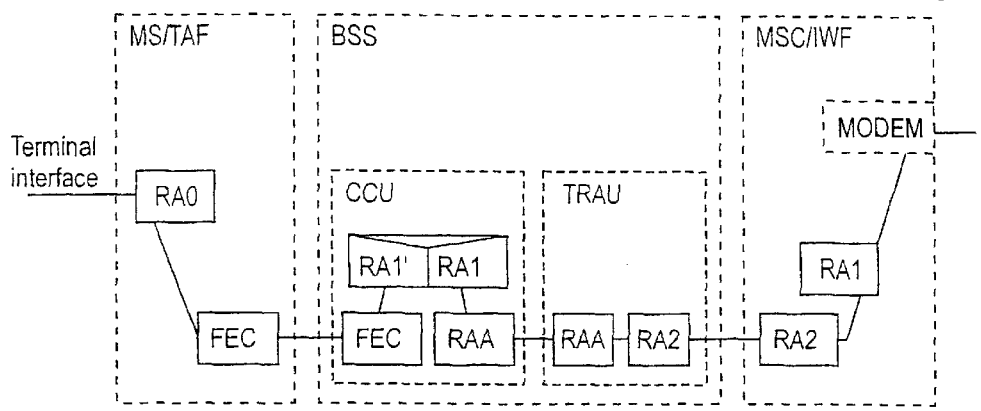

The present invention can be applied in all digital wireless telecommunication systems, such as cellular systems, WLL-type (Wireless Local Loop) and RLL-type (Radio Local Loop) networks and satellite-based mobile communications systems, among others, to introduce a new high-speed traffic channel at the radio interface without a need to define new rate adaptations for the transmission connections. In this connection the term 'mobile communications system' (or network) refers generally to all wireless telecommunication systems. There are several multiple access modulation techniques that facilitate communication with a plurality of mobile users. These techniques include time division multiple access (TDMA), code division multiple access (CDMA) and frequency division multiple access (FDMA). The physical concept of a traffic channel varies in different multiple access methods, and it is primarily defined by means of a time slot in TDMA systems, a spreading code in CDMA systems, a radio channel in FDMA systems, a combination of the former, etc. The basic idea of the present invention is independent of the type of the traffic channel and the multiple access method used.

The primarily field of application of the invention is the introduction of an EDGE radio interface into a GSM system or a corresponding change in other GSM-based systems, such as DCS1800 (Digital Communication System) and the US digital cellular system PCS (Personal Communication System), and in WLL systems based on the aforementioned systems. The invention will be described below by using as an example the GSM mobile system. The structure and operation of the GSM system are well known to those skilled in the art and they are defined in the GSM specifications of the ETSI (European Telecommunications Standards Institute). Reference is also made to *The GSM System for Mobile Communications,* M. Mouly & M. Pautet, Palaiseau, France, 1992, ISBN:2-9507190-0-7.

The basic structure of the GSM system comprises two parts: a base station system BSS and a network subsystem NSS. The BSS and mobile stations MS communicate via radio connections. In the base station system, each cell is served by a base station BTS. A number of base stations are connected to a base station controller BSC, which controls the radio frequencies and channels used by the BTS. The BSCs are connected to a mobile services switching centre MSC. Certain MSCs are connected to other telecommunication networks, such as the public switched telephone network PSTN, and they comprise gateway functions for calls bound for and arriving from these networks. These MSCs are known as gateway MSCs (GMSC). There are also at least two databases: a home location register HLR and a visitor location register VLR.

A mobile system comprises adapter functions for adapting an intranetwork data link to protocols used by terminal equipments and other telecommunication networks. The adapter functions typically include a terminal adaptation function TAF placed at the interface between a mobile station and a data terminal equipment connected thereto, and an interworking function IWF situated at the interface between the mobile network and another telecommunication network, usually in connection with an MSC. An MSC typically comprises several different types of adapter equipment pools for supporting different data services and protocols, such as a modem pool with modems and facsimile adapters for modem and facsimile services, a UDI/RDI rate adapter pool, etc. In the GSM system a data link is set up between a TAF of the MS and an IWF in the mobile network. The TAF adapts a data terminal equipment DTE connected to the MS to the aforementioned GSM data link that is set up over a physical connection using one or several traffic channels. The IWF connects the GSM data link to another network, such as an ISDN, another GSM network or a PSTN.

As described above, modern mobile communications systems support different teleservices and bearer services. The bearer services in the GSM system are defined in the GSM specification 02.02 and the teleservices are defined in the GSM specification 02.03. The bearer services are usually divided into groups according to a property, for example asynchronous and synchronous bearer services. Each of these groups comprises a number of bearer services, such as a transparent service (T) and a non-transparent service (NT). In a transparent service the data to be transmitted is unstructured and transmission errors are only corrected by means of channel coding. In a non-transparent service the data to be transmitted is structured into protocol data units (PDU), and transmission errors are corrected by using (in addition to channel coding) automatic retransmission protocols.

FIG. 1 shows an example of protocols and functions required in an IWF (either in an MSC or a WLL-specific network element) for transparent bearer services. A transparent circuit switched connection between a TAF and an IWF on a GSM traffic channel comprises several protocol layers that are common to all these services. They include different rate adaptation RA functions, such as RA1' between the TAF and a channel codec unit CCU located in the BSS, RA1 between the CCU and the IWF, RAA between the CCU and a transcoder unit TRAU located remote from the base station, and RA2 between the TRAU and the IWF. The rate adaptation functions RA are defined in the GSM recommendations 04.21 and 08.20. Communication between the CCU and the TRAU is defined in the GSM recommendation 08.60. Information that has been RA1' rate-adapted at the radio interface is also channel-coded as defined in the GSM recommendation 5.03, which is illustrated by blocks FEC in the MS and the CCU. The IWF and the TAF also comprise higher-level protocols that are specific to each service. In an asynchronous transparent bearer service shown in FIG. 1, the IWF requires asynchronous-to-synchronous conversion RA0 and a modem or a rate adapter towards the fixed network. A transparent signal propagates through the traffic channel between the terminal interface and the PSTN/ISDN. A transparent synchronous configuration is otherwise identical but it has no rate adaptation RA0.

Figure 3:
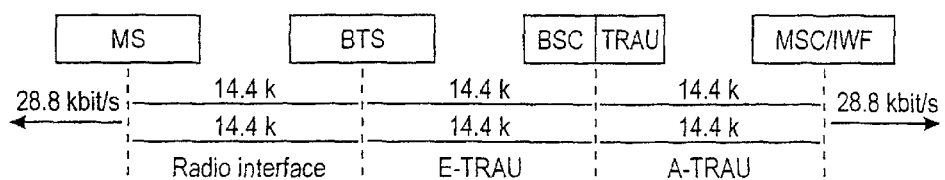
FIG. 3 illustrates a TCH/F14.4 multichannel configuration in the GSM.

FIG. 1 relates to a network configuration where the transcoder and some of the rate adaptations are situated outside the BTS in a so-called remote transcoder TRAU. The transcoder is operationally a part of the BSC. Physically the TRAU may be located either in the BSC or the MSC. The interface between the TRAU and the BTS is called an Abis interface. The Abis interface comprises 16 kbit/s traffic channels, four of which can be transmitted on a single standard 64 kbit/s channel. Information is transmitted between the CCU and the TRAU in fixed-length frames called TRAU frames. In these frames are transmitted both speech/data and control signals related to the TRAU. In case of channel coding of 4.8 kbit/s (TCH/F4.8) and 9.6 kbit/s (TCH/F9.6), when data is adapted to TRAU frames a rate adaptation function RA1/RAA is required in addition to the other rate adaptations. With the channel coding of 14.4 kbit/s (TCH/F14.4), a slightly different rate adaptation function RA1'/RAA' is required, as illustrated in FIG. 3. RA1'/RAA' converts the radio frames (blocks) into an E-TRAU format, and vice versa. The RAA' function converts the E-TRAU frame into an A-TRAU frame, and vice versa. Since the rate adaptation determined for TCH/F14.4 channel coding is obviously the best alternative also for EDGE radio interface traffic channels, the preferred embodiment of the invention is described by means thereof. It should be noted, however, that the invention can also be implemented with other rate adaptations, such as RA1/RAA.

Figure 2:
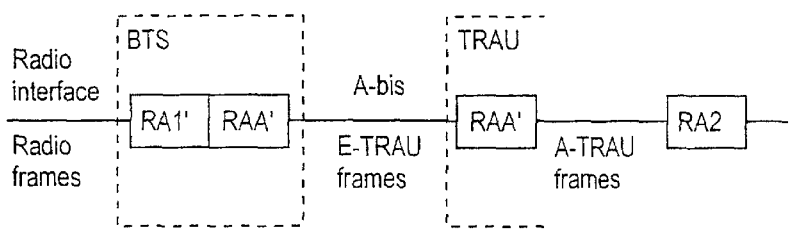
FIG. 2 shows Abis interface protocols for traffic channel TCH/F14.4.

In the HSCSD concept in the GSM system, a high-speed data signal is divided into separate data streams, which are then transmitted via N subchannels (N traffic channel time slots) at the radio interface and via N transmission channels (16 kbit/s) between the BTS and the IWF. When the data streams have been divided, they are transferred in the subchannels as if they were mutually independent until they are combined in the IWF or the MS. However, logically these N subchannels are parts of the same HSCSD connection, in other words they form one HSCSD traffic channel. According to the GSM recommendations, data streams are divided and combined in a modified RA0, which is thus common to all the subchannels. Below this common RA0, each subchannel comprises separately the same protocol stack RA1'-FEC-FEC-RA1'-RAA-RAA-RA2-RA2-RA1 or RA1'-FEC-FEC-RA1'-RAA'-RAA'-RA2-RA2-RA1, which is shown in FIGS. 1 and 2, respectively, for one traffic channel between the MS/TAF and the MSC/IWF. In transparent data transmission between the TAF and the IWF, the traffic channels are numbered in order to maintain the order of the data. Further, superframing is used within a traffic channel to increase the tolerance towards differences in transmission delays between the traffic channels. The channel and frame numbering is transmitted in the form of inband signalling.

FIG. 3 illustrates a multichannel configuration according to the GSM recommendations for TCH/F14.4 channel coding. An HSCSD traffic channel of 28.8 kbit/s comprises two parallel 14.4 kbit/s channels between the MS and the MSC/IWF.

If an EDGE radio interface rate of 28.8 or 38.4 kbit/s is to be supported with the present channel structures and TCH/F14.4 rate adaptations between the BTS and the IWF, the result will be, for example, such channel configurations as shown in FIG. 4 in single-slot and multislot cases. Each 28.8 EDGE channel requires two 14.4 kbit/s channels between the BTS and the MSC. Correspondingly, each 38.4 EDGE channel requires three 14.4 channels between the BTS and the MSC. Therefore the number of transmission channels is higher than the number of radio interface traffic channels, which differs from a conventional GSM channel configuration. A BTS must be implemented with a more complicated structure than previously in order that it is capable of performing the required conversions and adaptations between the radio interface and the Abis interface. Another requirement is the maintenance of the order of data when the data is transmitted via several parallel transmission channels. This requirement is particularly challenging when the radio interface also has a multichannel configuration.

The aim of the invention is to simplify the implementation of a base station in channel configurations of the type shown in FIG. 4. Since each transparent call always has at least two parallel TCH/F14.4 transmission channels via which the TRAU frames are transmitted, the BTS and the IWF provide the transmission frames to be transmitted with frame and/or channel numbering which indicates the order of the transmitted frames and/or the transmission channel via which the TRAU frame was transmitted. However, according to the invention the BTS does not restore the order of the downlink E-TRAU frames according to the aforementioned frame and/or channel numbering, but it places the data of the E-TRAU frames and at least the frame and/or channel numbering in the payload of the downlink EDGE radio interface frame to be transmitted. On the other hand, the MS, which extracts the data and the frame and/or channel numbering of the TRAU frames from the downlink EDGE frames, restores the correct order of the data on the basis of this numbering. The same procedure is followed in each case regardless of whether the radio interface has a single-channel or multichannel configuration. In all situations the MS and the IWF restore the order of the data, which simplifies the structure of the BTS, whereas the MS and the IWF become more complex. Instead of separate frame and/or channel numbering, the order of the data can be restored at the radio interface alternatively by means of the internal timing of the radio system, comprising time slot numbering. In such a case there is no need to provide the radio frames with numbering for this purpose.

Figure 4A:
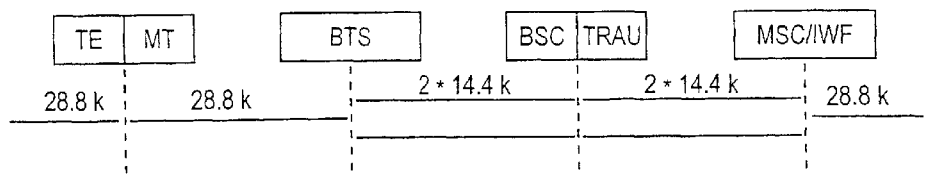
FIG. 4 illustrates different channel configurations when the present 14.4 kbit/s TRAU frames are used together with an EDGE air interface.
Figure 4B:
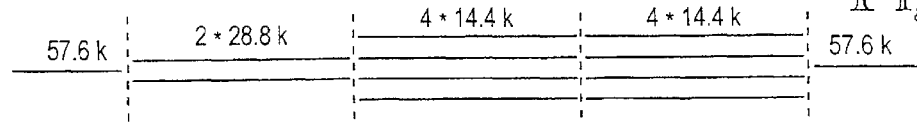
Figure 4C:
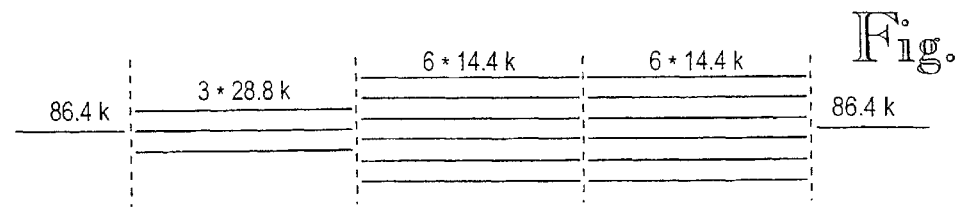
Figure 4D:
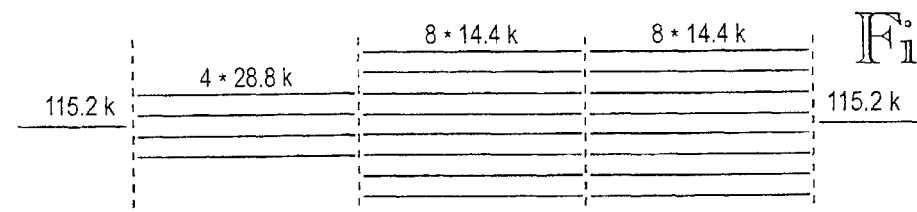
Figure 4E:
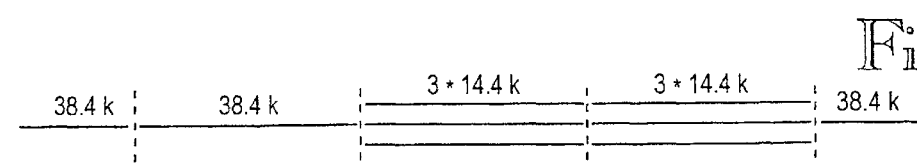
Figure 4F:
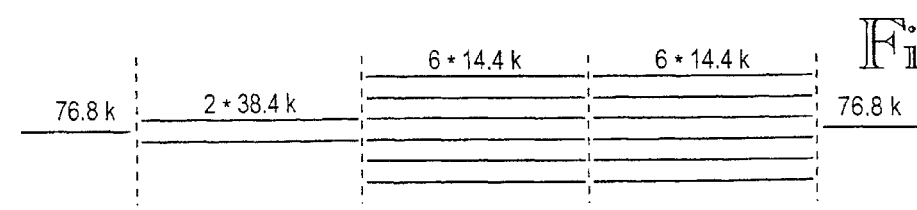
Figure 4G:
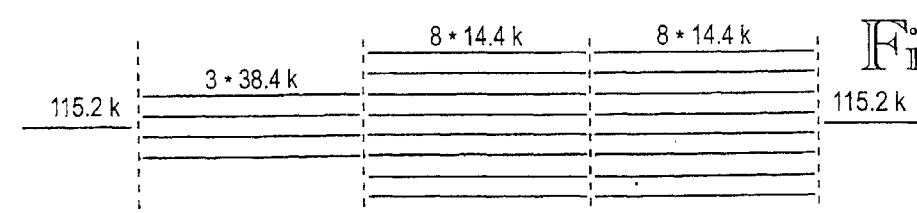

In the following, the invention will be described in greater detail by means of an example where the radio interface also has a multichannel configuration. It is assumed that a transparent call has a channel configuration as shown in FIG. 4b, i.e. two EDGE traffic channels (2*28.8 kbit/s) at the radio interface and four GSM TCH/F14.4 channels between the BTS and the IWF.

Figure 5:
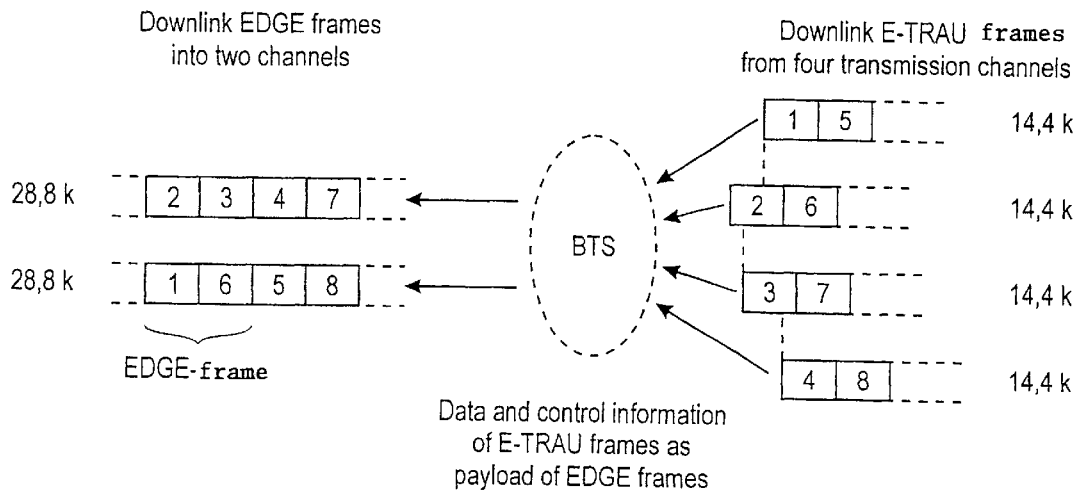
FIG. 5 illustrates transmission of information of the TRAU frames in EDGE radio interface frames towards the mobile station without the checking and restoration of the order at the base station.

Consider first data transmission in the downlink direction. The MSC/IWF divides a high-speed 57.6/64 kbit/s data stream into A-TRAU frames of four TCH14.4 channels and provides the A-TRAU frames with frame and channel numbering according to the GSM recommendations. The RAA' function of the transcoder TRAU (which, in practice, can be a part of the IWF) converts the A-TRAU frames into E-TRAU frames on each subchannel according to the GSM recommendations. The BTS receives the downlink E-TRAU frames and places the entire contents thereof, i.e. the data, status/control information and TRAU frame and/or channel numbering, in the EDGE frames, as shown in FIG. 5. In this case one EDGE frame is capable of carrying the payload of two E-TRAU frames in its payload. Unless the rate of the EDGE channel is a multiple of the transmission channel rate, some kind of rate adaptation is required. The BTS does not try to check or restore the order of the E-TRAU frames. The BTS also provides the EDGE frames to be transmitted to the different EDGE traffic channels with EDGE frame and channel numbering. The MS receives the downlink EDGE frames and extracts the payload (the contents of the E-TRAU frames), simultaneously restoring the order of the data on the basis of the EDGE frame and channel numbering. The MS thereafter separates the data and the control information of the E-TRAU frames from each other and restores the order of the data on the basis of the TRAU frame and/or channel numbering. The result is the original high-speed 57.6/64 kbit/s data stream.

Figure 6:
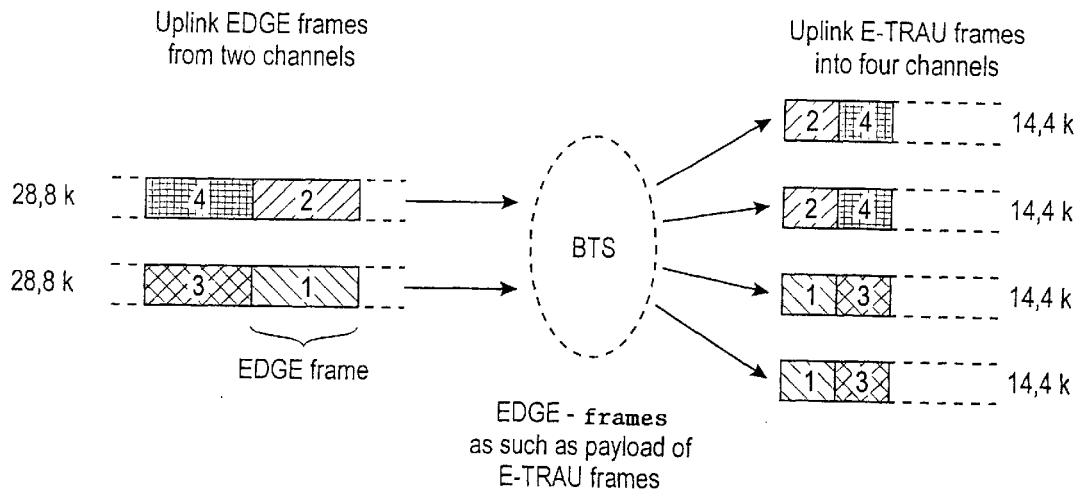
FIG. 6 illustrates the transmission of the EDGE radio interface frames in the TRAU frames towards the MSC/IWF without the checking and restoration of the order at the base station.

In the uplink direction the MS/TAF divides the high-speed 57.6/64 kbit/s data stream into the uplink EDGE frames of two 28.8 kbit/s EDGE traffic channels and provides the EDGE frames with EDGE frame and channel numbering. The BTS receives the uplink EDGE frames but it does not check or restore their order on the basis of the EDGE numbering. Instead, the BTS inserts the uplink EDGE frames as such into the data field of the E-TRAU frames, as shown in FIG. 6. In this case two E-TRAU frames are needed for each EDGE frame. Unless the rate of the EDGE channel is a multiple of the transmission channel rate, some kind of rate adaptation is required. The BTS divides the E-TRAU frames into four TCH/F14.4 channels and provides the frames with TRAU frame and channel numbering similarly as the IWF does in the downlink direction. The RAA' function of the TRAU converts the E-TRAU frames into A-TRAU frames on each subchannel according to the GSM recommendations. The IWF receives the A-TRAU frames and extracts the payload (i.e. the EDGE radio frames) from the A-TRAU frames and restores the order of the payload on the basis of the TRAU frame and channel numbering. The IWF thereafter extracts the data and the control information from the EDGE frames and restores the order of the data on the basis of the EDGE frame and/or channel numbering. The result is the original high-speed data stream.

It is obvious for those skilled in the art that as the technology develops the basic idea of the invention can be implemented in various ways. The invention and the embodiments thereof are thus not restricted to the examples described above, but they may vary within the scope of the claims.

What is claimed is:

1. A data transmission method in a digital mobile communications system, the method comprising steps of transmitting data in radio frames via N traffic channels over a radio interface between a base station and a mobile station, transmitting data in transmission frames via M transmission channels between the base station and an interworking function, where N and M are positive integers and $M \geq 2N$, providing the transmitted transmission frames in the base station and the interworking function with at least one of frame and channel numbering which enables restoration of order of the data, placing, in the base station, the data of the radio frames in the transmission frames in an uplink direction, and placing, in the base station, the data of the transmission frames in the radio frames in a downlink direction, placing, in the base station, at least one of the frame and channel numbering of the transmission frames in addition to the data as a payload of the radio frames, and restoring order of the data in the mobile station on the basis of at least one of said frame and channel numbering of the transmission frames.

2. A method according to claim 1, comprising placing, in the base station, control information of the transmission frame, preferably entire contents of the frame, as the payload of the radio frames in addition to the data in the downlink direction.

3. A method according to claim 1, comprising using internal timing of a radio system, comprising time slot numbering, to restore the order of the data that was transferred via different traffic channels over the radio interface.

4. A data transmission method in a digital mobile communications system, the method comprising steps of transmitting data in radio frames via N traffic channels over a radio interface between a base station and a mobile station, where $N \geq 2$, providing the transmitted radio frames with at least one of frame and channel numbering in the mobile station and the base station, transmitting the data in transmission frames via M transmission channels between the base station and an interworking function, where $M \geq 2N$, providing the transmitted transmission frames with at least one of frame and channel numbering in the mobile station and the interworking function, placing, in the base station, the data of the radio frames in the transmission frames in an uplink direction, and placing, in the base station, the data of the transmission frames in the radio frames in a downlink direction, placing, in the base station, also the frame and channel numbering of the transmission frames in addition to the data as a payload of the radio frames in the downlink direction, and restoring order of the data frames in the mobile station by means of at least one of the frame and channel numbering of the radio frames, extracting at least one of the data and the frame and channel numbering of the transmission frames from the data frames, restoring order of the data in the mobile station based on as least one of said frame and channel numbering of the transmission frames, placing, in the base station, also at least one of the frame and channel numbering of the radio frames in addition to the data as the payload of the transmission frames in the uplink direction, restoring order of the transmission frames in the interworking function by means of at least one of the frame and channel numbering of the transmission frames, extracting the data and at least one of the frame and channel numbering of the radio frames from the transmission frames, restoring order of the data in the interworking function on the basis of at least one of said frame and channel numbering of the radio frames.

5. A method according to claim 4, characterized comprising at least one of placing in the radio frames all the control information of the transmission frames, preferably the entire transmission frames, and placing in the transmission frames all the control information of the radio frames, preferably the entire radio frames as such.

6. A method according to claim 1, comprising between the base station and the interworking function, using transmission frames of a first type between the base station and the remote transcoder, using transmission frames of a second type between the remote transcoder and the interworking function, converting transmission frames of the first type into transmission frames of the second type and vice versa in the remote transcoder.

7. A digital mobile communications system, wherein a channel configuration of a transparent data call comprises N traffic channels at a radio interface between a base station and a mobile station, and M transmission channels between the base station and an interworking function, where N and M are positive integers and $M \geq 2N$, the data being transferred in transmission frames on transmission channels and in radio frames on radio interface traffic channels, the base station and the interworking function are configured to provide the transmitted transmission frames with at least one of frame and channel numbering in the base station and in the interworking function, the numbering enabling the restoration of order of the data, the base station being configured to place not only the data but also at least one of the frame and channel numbering of the transmission frames as a payload of the radio frames, and the mobile station being configured to restore the order of the data on the basis of at least one of said frame and channel numbering of the transmission frames.

8. A mobile communications system according to claim 7, wherein the base station is configured to place entire contents of the transmission frame as the payload of the radio frames.

9. A mobile communications system according to claim 7, wherein the order of the data transmitted over the radio interface via different traffic channels is restored by means of an internal timing of a radio system comprising time slot numbering.

10. A digital mobile communications system, wherein
a channel configuration of a transparent data call comprises N traffic channels at a radio interface between a base station and a mobile station, and M transmission channels between the base station and an interworking function, where $N \geq 2$ and $M \geq 2N$, the data being transferred in transmission frames on transmission channels and in radio frames on radio interface traffic channels,
the base station and the interworking function are configured to provide the transmitted transmission frames with at least one of first frame and channel numbering,
the base station and the mobile station are configured to provide the transmitted radio frames with at least one of second frame and channel numbering,
the base station being configured to place not only the data but also at least one of the first frame and channel numbering of the transmission frames as a payload of the radio frames in a downlink direction,
the mobile station being configured to restore order of the radio frames, or to restore order of their payload by means of at least one of said second frame and channel numbering,
the mobile station being configured to extract the data and at least one of said first frame and channel numbering from the payload of the radio frames,
the mobile station being configured to restore order of the data on the basis of at least one of said first frame and channel numbering,
the base station being configured to place not only the data but also at least one of the second frame and channel numbering of the radio frames as the payload of the transmission frames in an uplink direction,
the interworking function being configured to restore order of the transmission frames, or to restore order of their payload by means of at least one of said first frame and channel numbering,
the interworking function being configured to extract the data and at least one of said second frame and channel numbering from the payload of the transmission frames,
the interworking function being configured to restore order of the data on the basis of at least one of said second frame and channel numbering.

11. A mobile communications system according to claim 10, comprising at least one of
the base station configured to place in the radio frames all control information of the transmission frames, preferably entire contents of the transmission frame, and
the base station is configured to place in the transmission frames all the control information of the radio frames, preferably the radio frames as such.

12. A mobile communications system according to claim 7, wherein a remote transcoder unit is provided between the base station and the interworking function, and wherein that the mobile communications system comprises transmission frames of the first type between the base station and the remote transcoder, and transmission frames of the second type between the remote transcoder and the interworking function, and wherein the remote transcoder is configured to convert the transmission frames of the first type into transmission frames of the second type, and vice versa.

13. A base station in a mobile communications system where a channel configuration of a transparent data call comprises N traffic channels at a radio interface between a base station and a mobile station, and M transmission channels between the base station and an interworking function, where N and M are positive integers and $M \geq 2N$, the data being transferred in transmission frames on transmission channels and in radio frames on radio interface traffic channels, the transmission frames comprising at least one of frame and channel numbering that enables restoration of order of data if the order changes due to different transmission properties of the transmission channels, that the base station being configured to place, in addition to the data, at least one of the frame and channel numbering of the transmission frames as a payload of the radio frames for restoration of order of data in the mobile station.

14. A base station according to claim 13, wherein $N \geq 2$, and wherein the order of the data transmitted over the radio interface via different traffic channels is restored by using an internal timing of a radio system, comprising time slot numbering.

15. A base station according to claim 13, wherein $N \geq 2$, and wherein
the transmission frames comprise at least one of the first frame and channel numbering that enables the restoration of the order of data if the order changes due to different transmission properties of the transmission channels,
the radio frames comprise the at least one of second frame and channel numbering that enables the restoration of the order of data if the order changes due to different transmission properties of the radio interface traffic channels,
the base station is configured to place, in addition to the data, also at least one of the first frame and channel numbering of the transmission frames as the payload of the radio frames in the downlink direction for the purpose of restoring the order of the data in the mobile station,
the base station is configured to place, in addition to the data, also at least one of the second frame and channel numbering of the radio frames as the payload of the transmission frames in the uplink direction for the purpose of restoring the order of the data in the interworking function.

16. A mobile station in a mobile communications system where a channel configuration of a transparent data call comprises N traffic channels at a radio interface between a base station and a mobile station, and M transmission channels between the base station and an interworking function, where N and M are positive integers and $M \geq 2N$, the data being transferred in transmission frames on transmission channels and in radio frames on radio interface traffic channels, the transmission channels comprising at least one of frame and channel numbering that enables restoration of order of data if the order changes due to different transmission properties of the transmission channels, the mobile station comprising
means for receiving radio frames, a payload of which comprises, in addition to data, at least one of the frame and channel numbering of the transmission frames,
means for extracting the data and at least one of said frame and channel numbering from the payload of the radio frames, means for restoring the order of the data based on at least one of said frame and channel numbering.

17. A mobile station according to claim 16, wherein $N \geq 2$ and wherein the order of the data transmitted over the radio interface via different traffic channels is restored by means of the internal timing of the radio system, comprising time slot numbering, before said restoration of the order of data based on at least one of the frame and channel numbering of the transmission frames.

18. A mobile station in a mobile communications system where a channel configuration of a transparent data call comprises N traffic channels at a radio interface between a base station and a mobile station, and M transmission channels between the base station and an interworking function, where $N \geq 2$ and $M \geq 2N$, the data being transferred in transmission frames on transmission channels and in radio frames on radio interface traffic channels, the transmission channels comprising at least one of frame and channel numbering that enables restoration of order of data if the order changes due to different transmission properties of the transmission channels, and the radio frames comprising at least one of second frame and channel numbering that enables restoration of order of data if the order changes due to different transmission properties of the radio interface traffic channels, the mobile station comprising means for receiving radio frames, which comprise at least one of said second frame and channel numbering, and the payload of which comprises, in addition to data, also at least one of said first frame and channel numbering, means for restoring order of the radio frames or their payload by means of at least one of said second frame and channel numbering, means for extracting the data and at least one of said first frame and channel numbering from the payload of the radio frames, means for restoring order of the data based on at least one of said first frame and channel numbering.

19. A mobile communications system according to claim 10, wherein a remote transcoder unit is between the base station and the interworking function, and wherein the mobile communications system comprises transmission frames of a first type between the base station and the remote transcoder, and transmission frames of a second type between the remote transcoder and the interworking function, and that the remote transcoder is configured to convert the transmission frames of the first type into transmission frames of the second type, and vice versa.

* * * * *

UNITED STATES PATENT AND TRADEMARK OFFICE
CERTIFICATE OF CORRECTION

PATENT NO. : 6,721,304 B1
DATED : April 13, 2004
INVENTOR(S) : Räsänen

It is certified that error appears in the above-identified patent and that said Letters Patent is hereby corrected as shown below:

Title page,
Item [56], References Cited, FOREIGN PATENT DOCUMENTS, please add the following reference:
-- WO 98/21840  5/1998 --

Signed and Sealed this

Twenty-second Day of March, 2005

JON W. DUDAS
*Director of the United States Patent and Trademark Office*